United States Patent
Li et al.

(10) Patent No.: US 9,952,476 B2
(45) Date of Patent: Apr. 24, 2018

(54) ARRAY SUBSTRATE AND DISPLAY DEVICE

(71) Applicant: BOE Technology Group Co., Ltd., Beijing (CN)

(72) Inventors: Wenbo Li, Beijing (CN); Pan Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 6 days.

(21) Appl. No.: 15/127,984

(22) PCT Filed: Nov. 17, 2015

(86) PCT No.: PCT/CN2015/094799
§ 371 (c)(1),
(2) Date: Sep. 21, 2016

(87) PCT Pub. No.: WO2016/188056
PCT Pub. Date: Dec. 1, 2016

(65) Prior Publication Data
US 2017/0123256 A1 May 4, 2017

(30) Foreign Application Priority Data
May 26, 2015 (CN) ...................... 2015 2 0348058 U

(51) Int. Cl.
*G02F 1/1362* (2006.01)
*G02F 1/1343* (2006.01)
*G02F 1/1368* (2006.01)

(52) U.S. Cl.
CPC ........ *G02F 1/13624* (2013.01); *G02F 1/1368* (2013.01); *G02F 1/13439* (2013.01);
(Continued)

(58) Field of Classification Search
CPC ........... G02F 1/134309; G02F 1/13439; G02F 1/136227; G02F 1/136286; G02F 1/1368
See application file for complete search history.

(56) References Cited

U.S. PATENT DOCUMENTS

2001/0005247 A1* 6/2001 Kikkawa ............... G02F 1/1395
349/117
2004/0263747 A1* 12/2004 Chae ................. G02F 1/134363
349/139
(Continued)

FOREIGN PATENT DOCUMENTS

CN 101878448 A 11/2010
CN 103676389 A 3/2014
(Continued)

OTHER PUBLICATIONS

Mar. 4, 2016—(WO) International Search Report and Written Opinion Appn PCT/CN2015/094799 with English Tran.

*Primary Examiner* — Allen Parker
*Assistant Examiner* — Long H Le
(74) *Attorney, Agent, or Firm* — Banner & Witcoff, Ltd.

(57) ABSTRACT

An array substrate and a display device are provided. The array substrate includes a plurality of data lines; a plurality of gate lines; and a plurality of sub-pixel units defined by the gate lines and the data lines intersecting each other. The sub-pixel unit includes a first pixel electrode and a second pixel electrode respectively disposed on two sides of the gate line and a common electrode disposed between the first pixel electrode and the second pixel electrode. At least a first compensation electrode is connected to at least a side of the common electrode, at least a part of projection of it on a plane having the first pixel electrode overlaps the first pixel electrode; and/or at least a second compensation electrode is connected to a side of the first pixel electrode, and at least a part of projection of it on a plane having the common electrode overlaps the common electrode. The display device can have a wide viewing angle.

18 Claims, 3 Drawing Sheets

(52) U.S. Cl.
CPC .. *G02F 1/134309* (2013.01); *G02F 1/136227* (2013.01); *G02F 1/136286* (2013.01); *G02F 2001/134345* (2013.01); *G02F 2201/121* (2013.01); *G02F 2201/123* (2013.01)

(56) References Cited

U.S. PATENT DOCUMENTS

2014/0306222 A1* 10/2014 Wu .................... H01L 27/1255
  257/57
2016/0018709 A1* 1/2016 Jeong ................ G02F 1/136213
  349/38

FOREIGN PATENT DOCUMENTS

| CN | 104062824 A | 9/2014 |
|----|-------------|--------|
| CN | 204065625 U | 12/2014 |
| CN | 204101858 U | 1/2015 |
| CN | 204595398 U | 8/2015 |

* cited by examiner

ARRAY SUBSTRATE AND DISPLAY DEVICE

The application is a U.S. National Phase Entry of International Application No. PCT/CN2015/094799 filed on Nov. 17, 2015, designating the United States of America and claiming priority to Chinese Patent Application No. 201520348058.5, filed May 26, 2015. The present application claims priority to and the benefit of the above-identified applications and the above-identified applications are incorporated by reference herein in their entirety.

TECHNICAL FIELD

Embodiments of the invention relate to an array substrate and a display device.

BACKGROUND

With the development of display technologies, display devices are more and more widely used in various fields, such as daily life, technology. A liquid crystal panel of a display device includes an array substrate, a color filter substrate and liquid crystals between the array substrate and the color filter substrate. The array substrate includes a plurality of sub-pixel units, liquid crystals corresponding to each of the sub-pixel units are deflected in an electric field formed by pixel electrodes and common electrodes. Through controlling a voltage of the electric field formed by the pixel electrodes and common electrodes, it is possible to control a deflection angle of the liquid crystals corresponding to each of the sub-pixel units, thereby realizing a grayscale display.

For display devices, such as mobile phones, televisions, computers or public information display devices, the display devices need to have a wide viewing angle to meet the requirements that users can see high quality images on the display devices from various angles. However, in a conventional display device, the voltages of the electric fields used to control the liquid crystals corresponding to each of the sub-pixel units to deflect are of the same, and the deflection angles of the liquid crystals corresponding to each of the sub-pixel units are consistent to each other, thereby causing the view angle of the display device to be relatively narrow.

SUMMARY

Embodiments of the present disclosure provide an array substrate and display device. Different electric fields occur in each of sub-pixel units with different voltages, so that the deflection angles of the liquid crystals corresponding to each of the sub-pixel units are different, and the display device can have a wide viewing angle.

In one aspect, embodiments of the present invention provide an array substrate, including: a plurality of data lines extending along a first direction; a plurality of gate lines extending along a second direction perpendicular to the first direction; and a plurality of sub-pixel units defined by the plurality of the gate lines and the plurality of data lines intersecting each other. The sub-pixel unit includes a first pixel electrode and a second pixel electrode respectively disposed on two sides of the gate line and a common electrode disposed between the first pixel electrode and the second pixel electrode. At least a first compensation electrode is connected to a side of the common electrode, at least a part of projection of the first compensation electrode on a plane, in which the first pixel electrode is located, overlaps the first pixel electrode; and/or at least a second compensation electrode is connected to a side of the first pixel electrode, and at least a part of projection of the second compensation electrode on a plane, in which the common electrode is located, overlaps the common electrode.

In a possible implementation, the sub-pixel unit further includes a first thin film transistor (TFT) and a second TFT, the gate line acts as a gate electrode of the first TFT and the second TFT, the data line acts as a source electrode of the first TFT and the second TFT, a drain electrode of the first TFT is electrically connected to the first pixel electrode, and a drain electrode of the second TFT is electrically connected to the second pixel electrode.

In a possible implementation, the common electrode includes a first common electrode and a second common electrode, the first common electrode is disposed between the first pixel electrode and the gate line, and the second common electrode is disposed between the second pixel electrode and the gate line.

In a possible implementation, the sub-pixel unit includes a common TFT shared by the first pixel electrode and the second pixel electrode, the gate line acts as a gate electrode of the common TFT, the data line acts as a source electrode of the common TFT, and a drain electrode of the common TFT is electrically connected to the first pixel electrode and the second pixel electrode.

In a possible implementation, the second pixel electrode overlaps a whole or a part of the drain electrode of the second thin film transistor.

In a possible implementation, the drain electrode of the second TFT includes a drain electrode body and a bend portion connected to the drain electrode body, at least a part of projection of the drain electrode body on a plane, in which the second pixel electrode is located, overlaps the second pixel electrode, projection of the bend portion on the plane, in which the second pixel electrode is located, falls outside the second pixel electrode, and a channel of the second TFT is formed between the bend portion and the source electrode of the second TFT.

In a possible implementation, the drain electrode of the first TFT is electrically connected to the first pixel electrode through a first via hole, and the drain electrode of the second TFT is electrically connected to the second pixel electrode through a second via hole.

In a possible implementation, both of the first pixel electrode and the second pixel electrode are Indium Tin Oxide electrodes or Indium Zinc Oxide electrodes.

In another aspect, embodiments of the present invention also provide a display device, including the array substrate.

Embodiments of the present invention provide an array substrate and display device, which includes a plurality of sub-pixel units, each of the sub-pixel units including a first pixel electrode and a second pixel electrode and a common electrode disposed between the first pixel electrode and the second pixel electrode, an electric field is created between the first pixel electrode and common electrode, an electric field is also created between the second pixel electrode and common electrode. A first compensation electrode is connected to a side of the common electrode, at least a part of projection of the first compensation electrode on a plane, in which the first pixel electrode is located, overlaps the first pixel electrode, and a voltage created between the first compensation electrode and the first pixel electrode can compensate the electric field between the first pixel electrode and the common electrode; and/or a second compensation electrode is connected to at least a side of the first pixel electrode, and at least a part of projection of the second compensation electrode on a plane, in which the common electrode is located, overlaps the common electrode, and a voltage created between the second compensation electrode and the common electrode can compensate the electric field between the first pixel electrode and the common electrode. Due to the voltage compensation to the electric field between the first pixel electrode and the common electrode, the voltage of the electric field between the first pixel electrode and common electrode is different from that of the electric field between the second pixel electrode and common electrode, so that two different electric fields with different voltages are created in each of the sub-pixel unit, and the deflection angles of the liquid crystal corresponding to each of the sub-pixel unit under two different voltages are different. A display device with wide viewing angle is realized.

BRIEF DESCRIPTION OF THE DRAWINGS

Simple description will be given below to the accompanying drawings of embodiments to provide a more clear understanding of the technical solutions of the embodiments of the present invention. It is apparent that the drawings described below only involve some embodiments of the present invention, and various other drawings can be obtained by one of ordinary skill in the art without creative labor.

NUMERAL REFERENCES

10—data line, 11—gate line,
12—first pixel electrode, 13—second pixel electrode,
14—common electrode, 15a—first compensation electrode, 15b—second compensation electrode,
16—drain electrode of the first TFT, 17—drain electrode of the second TFT,
18—first common electrode, 19—first via hole,
20—second via hole, 21—first TFT,
22—second TFT, 23—drain electrode body,
24—bend portion, 25—second common electrode,
26—common TFT, 27—drain electrode of common TFT

DETAILED DESCRIPTION

Technical solutions according to the embodiments of the present disclosure will be described clearly and completely as below in conjunction with the accompanying drawings of embodiments of the present disclosure. It is apparent that the described embodiments are only a part of but not all of the exemplary embodiments of the present disclosure. Based on the described embodiments of the present disclosure, various other embodiments can be obtained by those of ordinary skill in the art without creative labor and those embodiments shall fall into the protection scope of the present disclosure.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "the," or the like, are not intended to limit the amount, but for indicating the existence of at lease one. The terms, such as "connect/connecting/connected," "couple/coupling/coupled" or the like, are not limited to a physical connection or mechanical connection, but may include an electrical connection/coupling, directly or indirectly. The terms, "on," "under," "left," "right" or the like are only used to indicate relative position relationship, and when the position of the object which is described is changed, the relative position relationship may be changed accordingly.

Thicknesses and sizes of various film layers of the drawings do not reflect actual scale and are only for schematically illustrating embodiments of the invention.

Figure 1:
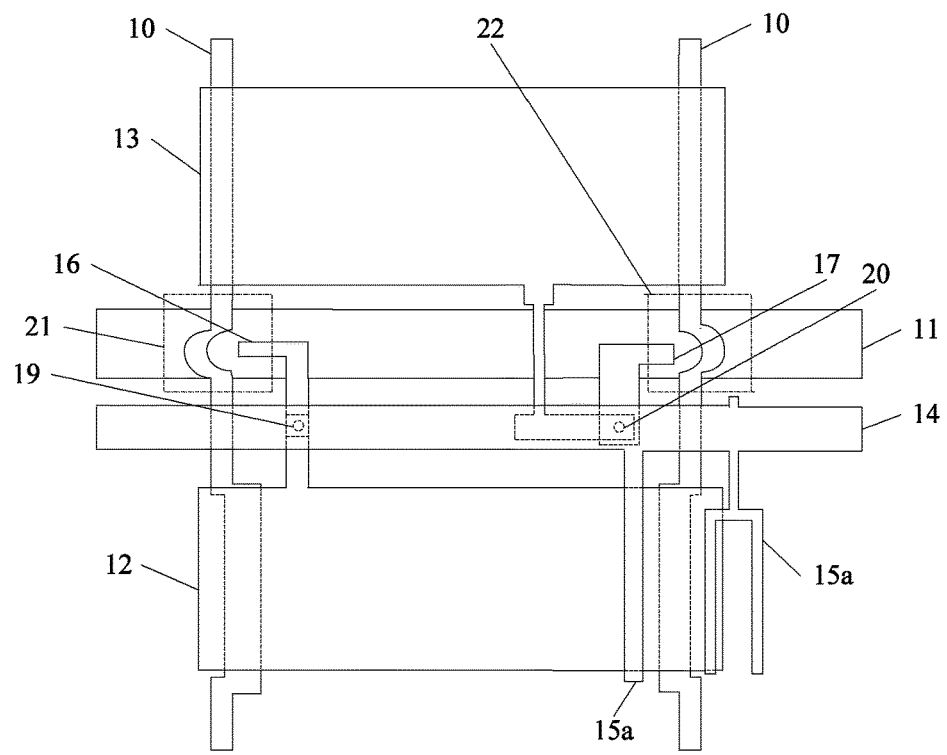
FIG. 1 illustrates a first schematic diagram of a sub-pixel unit of an array substrate in accordance with an embodiment of the invention.
Figure 2:
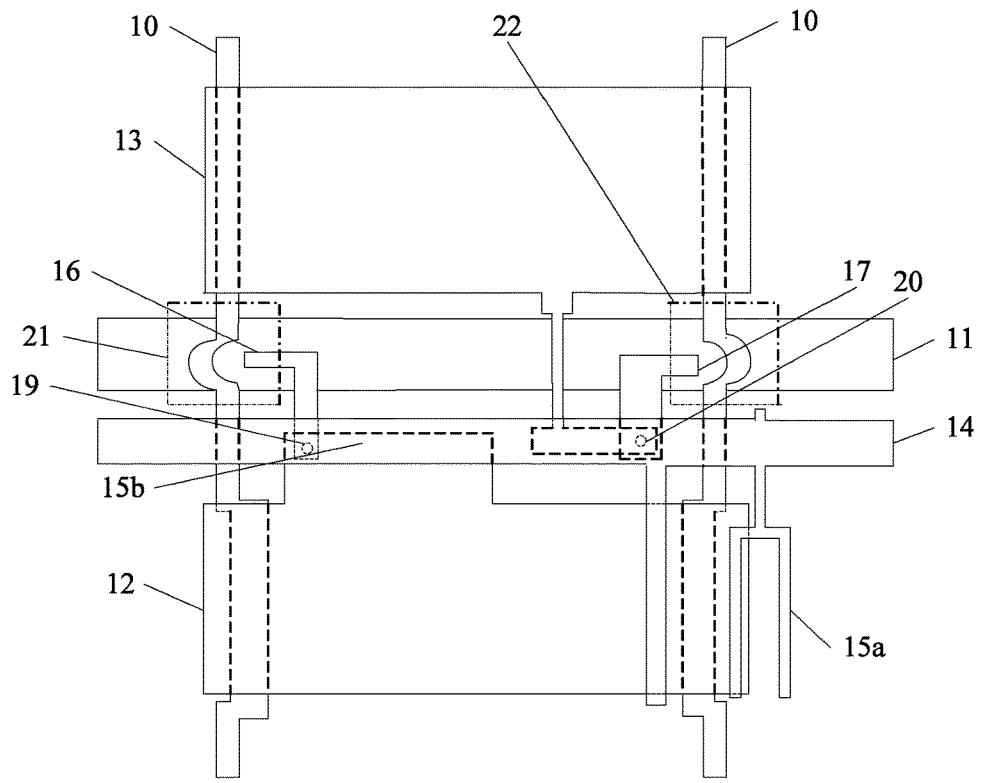
FIG. 2 illustrates a second schematic diagram of a sub-pixel unit of an array substrate in accordance with an embodiment of the invention.

An embodiment of the invention provides an array substrate. As illustrated in FIG. 1, the array substrate includes a plurality of data lines 10 extending longitudinally, a plurality of gate lines 11 extending laterally, and a plurality of sub-pixel units defined by the plurality of the gate lines 10 and the plurality of data lines 11 intersecting each other. As illustrated in FIG. 1, each of the sub-pixel units includes a first pixel electrode 12 and a second pixel electrode 13 respectively disposed on two sides of the gate line 11 and a common electrode 14 disposed between the first pixel electrode 12 and the second pixel electrode 13. A first compensation electrode 15a is connected to a side of the common electrode 14, and quantities and sizes of the first compensation electrode 15a will not be defined herein. The quantity of the first compensation electrode 15a may be one, or more, for example. A shape of the first compensation electrode 15a may be a rectangle, or cross-shaped, for example. At least a part of projection of the first compensation electrode 15a on a plane, in which the first pixel electrode 12 is located, overlaps the first pixel electrode 12. That is, the projection of the first compensation electrode 15a has an overlapping part with the projection of the first pixel electrode 12 on the plane, in which the first pixel electrode 12 is located. As the first compensation electrode 15a is disposed on a side of the common electrode 14, at least a part of a voltage of an electric field created between the first compensation electrode 15a and the first pixel electrode 12 can compensate an electric field created between the common electrode 14 and the first pixel electrode 12. Alternatively, as illustrated in FIG. 2, a second compensation electrode 15b may also be disposed on a side of the first pixel electrode 12, and the first pixel electrode 12 is connected to the second compensation electrode 15b. Quantities and sizes of the second compensation electrode 15b will not be defined herein. The quantity of the second compensation electrode 15b may be one, or more, for example. A shape of the second compensation electrode 15b may be a rectangle, or cross-shaped, for example. At least a part of projection of the second compensation electrode 15b on a plane, in which the common electrode 14 is located, overlaps the common electrode 14. That is, the projection of the second compensation electrode 15b has an overlapping part with the projection of the common electrode 14 on the plane, in which the common electrode 14 is located. As the second compensation electrode 15b is disposed on a side of the first pixel electrode 12, at least a part of a voltage of an electric field formed between the second compensation electrode 15b and the common electrode 14 can compensate an electric field formed between the common electrode 14 and the first pixel electrode 12. Moreover, it is also possible to dispose the second compensation electrode 15b on a side of the first pixel electrode 12 and dispose the first compensation 15a on a side of the common electrode 14 simultaneously. Due to the compensation to the voltage of the electric field formed between the common electrode 14 and the first pixel electrode 12, the voltage of the electric field formed between the common electrode 14 and the first pixel electrode 12 is different from a voltage of an electric field formed between the second pixel electrode 13 and the common electrode 14. Then, two electric fields having different voltages are created in each of the sub-pixel units, to allow the liquid crystals corresponding to each of the sub-pixel units having different deflection angles under the two different voltages, and a display device with wide viewing angle is realized.

Furthermore, for the convenience of control, as illustrated in FIG. 1 and FIG. 2, each of the sub-pixel units of the array substrate provided by the embodiment of the invention may further include a first thin film transistor (TFT) 21 and a second TFT 22, the gate line 11 may act as gate electrodes of the first TFT 21 and the second TFT 22, and the data line 10 may act as source electrodes of the first TFT 21 and the second TFT 22. A drain electrode 16 of the first TFT 21 is electrically connected to the first pixel electrode 12, and a drain electrode 17 of the second TFT 22 is electrically connected to the second pixel electrode 13. Specifically, the drain electrode 16 of the first TFT 21 is electrically connected to the first pixel electrode 12 through a first via hole 19. The via hole 19 may be disposed in a passivation layer between the first pixel electrode 12 and the drain electrode 16 of the first TFT 21. A drain electrode 17 of the second TFT 22 is electrically connected to the second pixel electrode 13 through a second via hole 20. The via hole 20 may be disposed in a passivation layer between the second pixel electrode 13 and the drain electrode 17 of the second TFT 22. Each of the first pixel electrode 12 and the second pixel electrode 13 may be an Oxide electrode, such as Indium Tin Oxide electrodes, or Indium Zinc Oxide electrodes.

Figure 3:
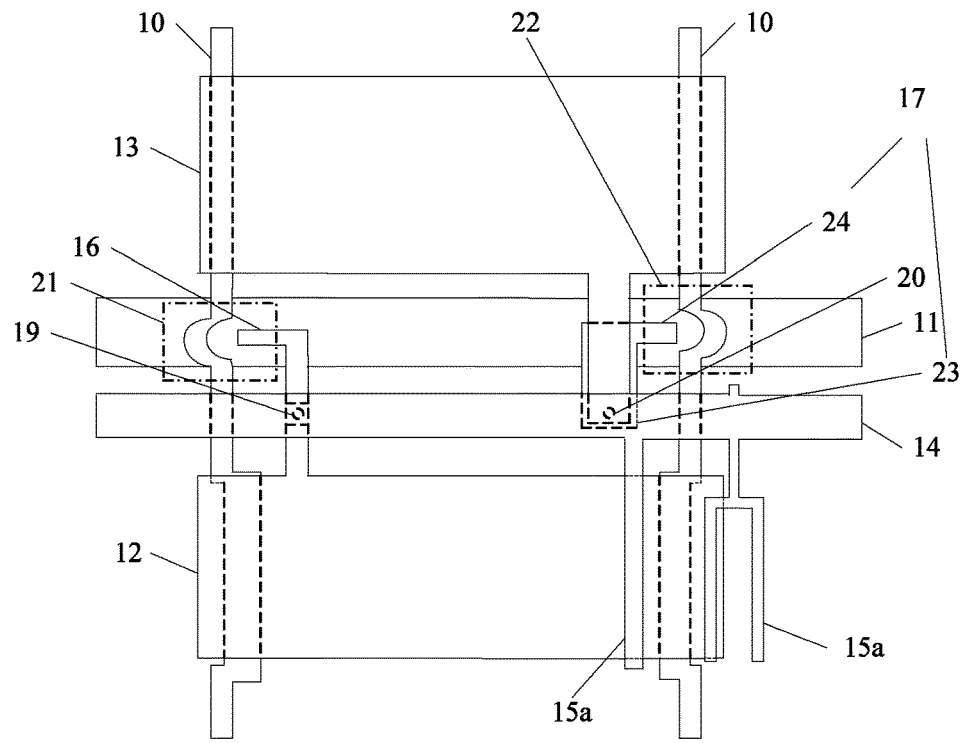
FIG. 3 illustrates a third schematic diagram of a sub-pixel unit of an array substrate in accordance with an embodiment of the invention.

It is noted that, as illustrated in FIG. 3, in order to reduce the parastitic capacitance between the drain electrode 17 of the second TFT 22 and the second pixel electrode 13, the drain electrode 17 of the second TFT 22 may be electrically connected to the second pixel electrode 13 through the via hole 20. Moreover, the drain electrode 17 of the second TFT 22 includes a drain electrode body 23 and a bend portion 24 connected to the drain electrode body 23, at least a part of projection of the drain electrode body 23 on a plane, in which the second pixel electrode 13 is located, overlaps the second pixel electrode 13, and projection of the bend portion 24 on the plane, in which the second pixel electrode 13 is located, falls outside the second pixel electrode 13. At least a part of projection of the drain electrode body 23 of the drain electrode 17 of the second TFT 22 on the plane, in which the second pixel electrode 13 is located, overlaps the second pixel electrode 13, that is, the second pixel electrode 13 may overlay the whole drain body 23 or a part of the drain body 23. The configuration that the drain electrode body 23 overlaps the second pixel electrode 13 allows an overlapping area of the drain electrode 17 and the second pixel electrode 13 which may introduce a parastitic capacitance is reduced to an overlapping area of the drain electrode body 23 and the second pixel electrode 13, thus the overlapping area of the drain electrode 17 and the second pixel electrode 13 is reduced and the parastitic capacitance is decreased. A channel of the second TFT 22 is formed between the bend portion 24 and the source electrode of the second TFT 22, and the projection of the bend portion 24 of the drain electrode 17 of the second TFT 22 on the plane, in which the second pixel electrode 13 is located, falls outside the second pixel electrode 13, that is, the second pixel electrode 13 does not overlay the bend portion 24, which allows the second pixel electrode 13 not overlaying the channel of the second TFT 22 and prevents the parastitic capacitance formed between the second pixel electrode 13 and the channel, and the interference of the parastitic capacitance is further reduced.

Figure 4:
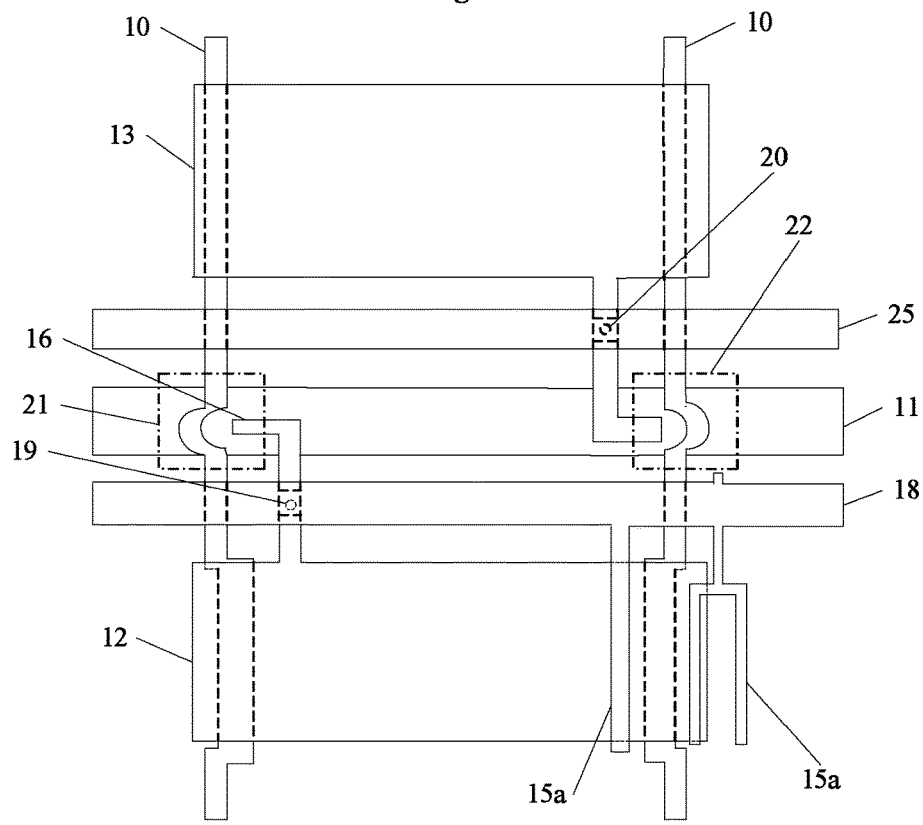
FIG. 4 illustrates a fourth schematic diagram of a sub-pixel unit of an array substrate in accordance with an embodiment of the invention.

As illustrated in FIG. 4, the common electrode of each of the sub-pixel units on the array substrate provided by the embodiment of the invention may include a first common electrode 18 and a second common electrode 25. The first common electrode 18 is disposed between the first pixel electrode 12 and the gate line 11, and the second common electrode 25 is disposed between the second pixel electrode 13 and the gate line 11. Similar to the configuration of the compensation electrodes in FIG. 1 and FIG. 2, a first compensation electrode 15a is disposed on a side of the first common electrode 18, and the first common electrode 18 is connected to the first compensation electrode 15a, and at least a part of the projection of the first compensation electrode 15a on the plane, in which the first pixel electrode 12 is located, overlaps the first pixel electrode 12; and/or a second compensation electrode (not shown in the drawing) is disposed on a side of the first pixel electrode 12, the first pixel electrode 12 is connected to the second compensation electrode, and at least a part of the projection of the second compensation electrode on a plane, in which the first common electrode 18 is located, overlaps the first common electrode 18.

Figure 5:
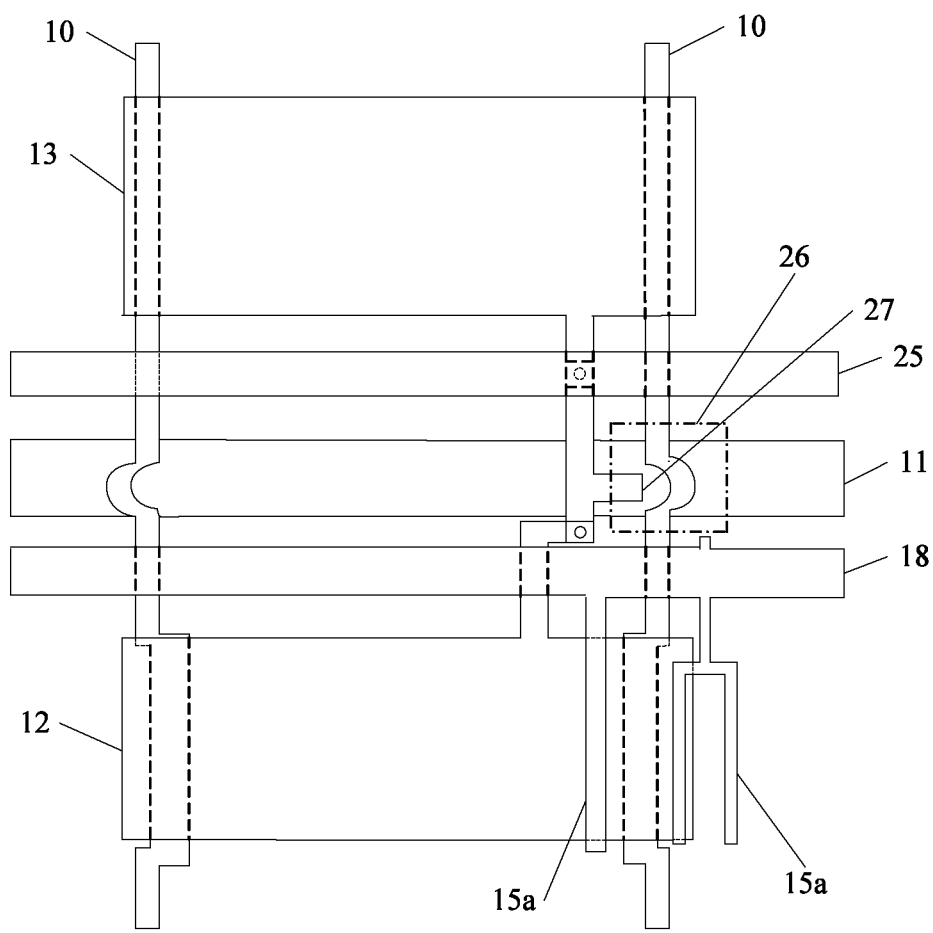
FIG. 5 illustrates a fifth schematic diagram of a sub-pixel unit of an array substrate in accordance with an embodiment of the invention.

For the convenience of control, as illustrated in FIG. 5, each of the sub-pixel units further includes a common TFT 26 shared by the first pixel electrode 12 and the second pixel electrode 13, the gate line 11 acts as a gate electrode of the common TFT 26, the data line 10 acts as a source electrode of the common TFT 26, and a drain electrode 27 of the common TFT 26 is electrically connected to the first pixel electrode 12 and the second pixel electrode 13. Specifically, the drain electrode 27 of the common TFT may be electrically connected to the first pixel electrode 12 and the second pixel electrode 13 through via holes, a via hole for connecting the drain electrode 27 and the first pixel electrode 12 may be disposed in a passivation layer between the drain electrode 27 and the first pixel electrode 12, and a via hole for connecting the drain electrode 27 and the second pixel electrode 13 may be disposed in a passivation layer between the drain electrode 27 and the second pixel electrode 13. By the design illustrated in FIG. 5, it is possible to control the switch state of an electric field created between the first pixel electrode 12 and the first common electrode 18 and the switch state of an electric field created between the second pixel electrode 13 and the second common electrode 25 through the common TFT 26.

The embodiments of the invention also provide a display device including the array substrate of any of the above embodiments such that the display device can be realized with a wide viewing angle, which will not be repeated herein. The display device may be a liquid crystal display panel, an e-paper, a mobile phone, tablet PC, a television, a display, a laptop computer, a digital photo-frame, a navigator or any products or components with a display function, for example.

The described above are only illustrative implementations for explaining the present disclosure, and the present disclosure is not limited thereto. For one of ordinary skill in the art, various modifications and improvements may be made without departing from the spirit and scope of embodiments of the present disclosure, and all equivalent solutions shall fall within the scope of the present disclosure. The scope of the disclosure is defined by the accompanying claims.

The present application claims the benefits and priority of the Chinese patent application No. 201520348058.5, filed on May 26, 2015, and entitled "Array Substrate and Display Device", which is incorporated herein by reference in its entirety.

What is claimed is:

1. An array substrate, comprising:
a plurality of data lines extending along a first direction;
a plurality of gate lines extending along a second direction perpendicular to the first direction; and
a plurality of sub-pixel units defined by the plurality of the gate lines and the plurality of data lines intersecting each other, wherein each of the sub-pixel units comprises a first pixel electrode and a second pixel electrode respectively disposed on two sides of the gate line and a common electrode disposed between the first pixel electrode and the second pixel electrode, at least a first compensation electrode is connected to a side of the common electrode, at least a part of projection of the first compensation electrode on a plane, in which the first pixel electrode is located, overlaps the first pixel electrode, and at least a second compensation electrode is connected to a side of the first pixel electrode, and at least a part of projection of the second compensation electrode on a plane, in which the common electrode is located, overlaps the common electrode.

2. The array substrate according to claim 1, wherein the sub-pixel unit further comprises a first thin film transistor (TFT) and a second TFT, the gate line acts as a gate electrode of the first TFT and the second TFT, the data line acts as a source electrode of the first TFT and the second TFT, a drain electrode of the first TFT is electrically connected to the first pixel electrode, and a drain electrode of the second TFT is electrically connected to the second pixel electrode.

3. The array substrate according to claim 2, wherein the second pixel electrode overlaps a whole or a part of the drain electrode of the second thin film transistor.

4. The array substrate according to claim 2, wherein the drain electrode of the second TFT comprises a drain electrode body and a bend portion connected to the drain electrode body, at least a part of projection of the drain electrode body on a plane, in which the second pixel electrode is located, overlaps the second pixel electrode, projection of the bend portion on the plane, in which the second pixel electrode is located, falls outside the second pixel electrode, and a channel of the second TFT is formed between the bend portion and the source electrode of the second TFT.

5. The array substrate according to claim 2, wherein the drain electrode of the first TFT is electrically connected to the first pixel electrode through a first via hole, and the drain electrode of the second TFT is electrically connected to the second pixel electrode through a second via hole.

6. The array substrate according to claim 1, wherein the common electrode comprises a first common electrode and a second common electrode, the first common electrode is disposed between the first pixel electrode and the gate line, and the second common electrode is disposed between the second pixel electrode and the gate line.

7. The array substrate according to claim 6, wherein the sub-pixel unit comprises a common TFT shared by the first pixel electrode and the second pixel electrode, the gate line acts as a gate electrode of the common TFT, the data line acts as a source electrode of the common TFT, and a drain electrode of the common TFT is electrically connected to the first pixel electrode and the second pixel electrode.

8. The array substrate according to claim 1, wherein both of the first pixel electrode and the second pixel electrode are Indium Tin Oxide electrodes or Indium Zinc Oxide electrodes.

9. A display device comprising the array substrate according to claim 1.

10. An array substrate, comprising:
a plurality of data lines extending along a first direction;
a plurality of gate lines extending along a second direction perpendicular to the first direction; and
a plurality of sub-pixel units defined by the plurality of the gate lines and the plurality of data lines intersecting each other, wherein each of the sub-pixel units comprises a first pixel electrode and a second pixel electrode respectively disposed on two sides of the gate line and a common electrode disposed between the first pixel electrode and the second pixel electrode, at least a first compensation electrode is connected to a side of the common electrode, at least a part of projection of the first compensation electrode on a plane, in which the first pixel electrode is located, overlaps the first pixel electrode, or at least a second compensation electrode is connected to a side of the first pixel electrode, and at least a part of projection of the second compensation electrode on a plane, in which the common electrode is located, overlaps the common electrode.

11. The array substrate according to claim 10, wherein the sub-pixel unit further comprises a first thin film transistor (TFT) and a second TFT, the gate line acts as a gate electrode of the first TFT and the second TFT, the data line acts as a source electrode of the first TFT and the second TFT, a drain electrode of the first TFT is electrically connected to the first pixel electrode, and a drain electrode of the second TFT is electrically connected to the second pixel electrode.

12. The array substrate according to claim 11, wherein the second pixel electrode overlaps a whole or a part of the drain electrode of the second thin film transistor.

13. The array substrate according to claim 11, wherein the drain electrode of the second TFT comprises a drain electrode body and a bend portion connected to the drain electrode body, at least a part of projection of the drain electrode body on a plane, in which the second pixel electrode is located, overlaps the second pixel electrode, projection of the bend portion on the plane, in which the second pixel electrode is located, falls outside the second pixel electrode, and a channel of the second TFT is formed between the bend portion and the source electrode of the second TFT.

14. The array substrate according to claim 11, wherein the drain electrode of the first TFT is electrically connected to the first pixel electrode through a first via hole, and the drain electrode of the second TFT is electrically connected to the second pixel electrode through a second via hole.

15. The array substrate according to claim 10, wherein the common electrode comprises a first common electrode and a second common electrode, the first common electrode is disposed between the first pixel electrode and the gate line, and the second common electrode is disposed between the second pixel electrode and the gate line.

16. The array substrate according to claim 15, wherein the sub-pixel unit comprises a common TFT shared by the first pixel electrode and the second pixel electrode, the gate line acts as a gate electrode of the common TFT, the data line acts as a source electrode of the common TFT, and a drain electrode of the common TFT is electrically connected to the first pixel electrode and the second pixel electrode.

17. The array substrate according to claim 10, wherein both of the first pixel electrode and the second pixel electrode are Indium Tin Oxide electrodes or Indium Zinc Oxide electrodes.

18. A display device comprising the array substrate according to claim 10.

* * * * *